Jan. 5, 1932.    T. T. GREENWOOD    1,840,032
BRAKE
Filed Aug. 10, 1928
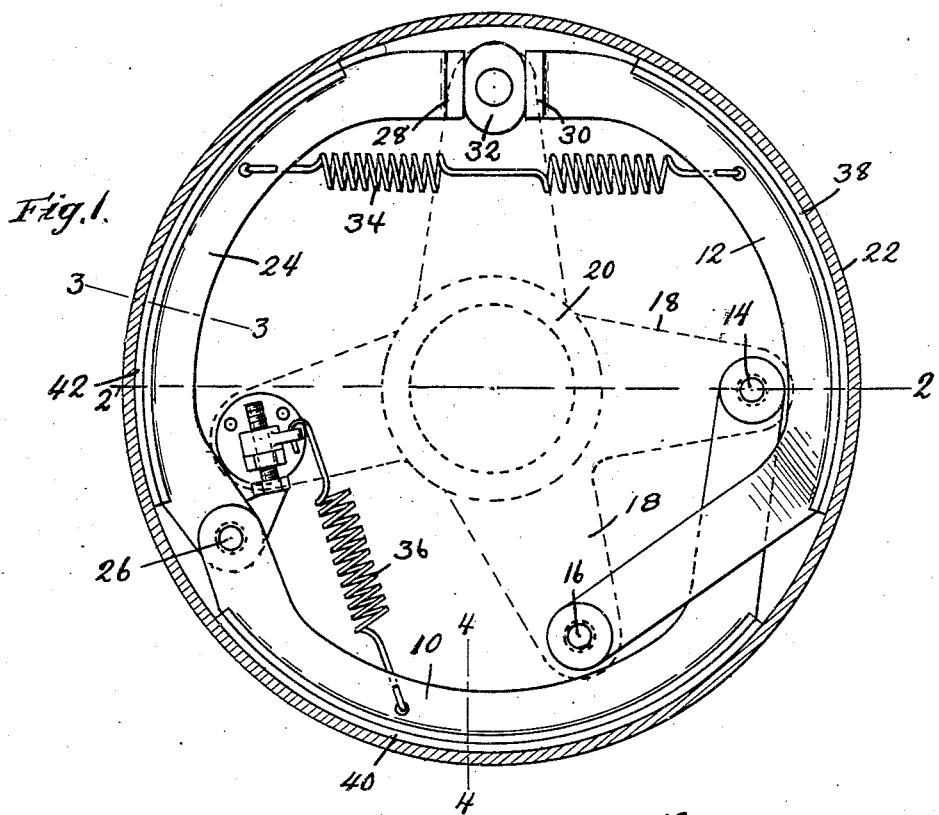
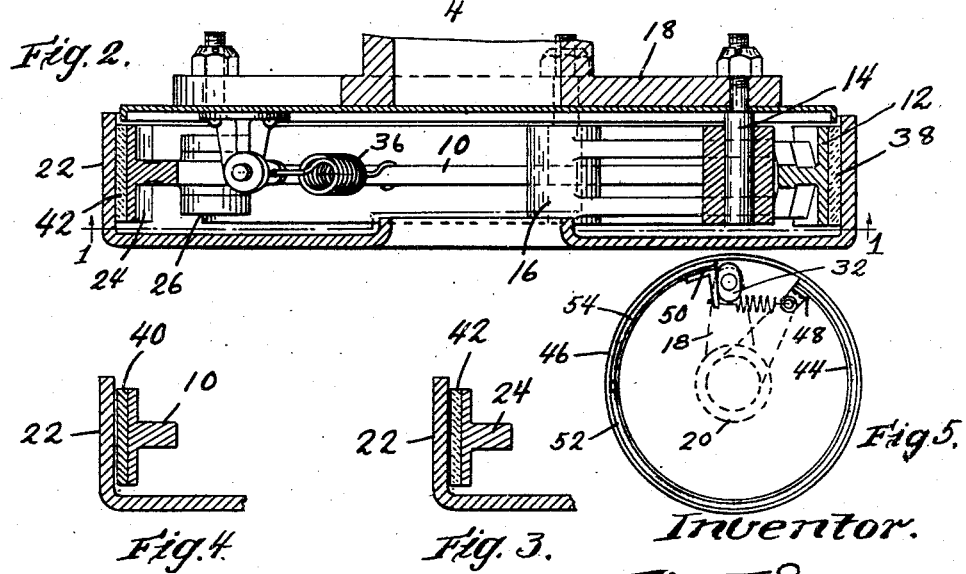
Inventor.
Talma T. Greenwood Patented Jan. 5, 1932

1,840,032

UNITED STATES PATENT OFFICE

TALMA T. GREENWOOD, OF EAST TEMPLETON, MASSACHUSETTS

BRAKE

Application filed August 10, 1928. Serial No. 298,895.

This invention relates to brakes, and especially to automobile brakes, which are characterized by having about the same braking effort under diverse operating conditions, as when the brake is dry and also when it is wet.

In my copending application Serial No. 223,163, filed September 30, 1927, now Patent No. 1,758,253, issued May 13, 1930, I have described and claimed a brake wherein the braking surfaces are composed of different materials one of which has its coefficient of friction increased and the other reduced when wet, with the effective areas of the surfaces such that the composite coefficient of friction, or braking effort, is about the same, whether the brake is dry or wet.

It is an object of the present invention to provide a brake utilizing the above principle, wherein a loss in friction of the brake is largely compensated for automatically in the application of the brake when it is wet.

A further object is the provision of a brake wherein the rotation of the brake drum is caused largely to compensate automatically for a loss in friction of the brake when it is wet.

Another object of the invention is the provision of a brake having means to multiply the variation of friction in one portion of the brake on another portion thereof.

A yet further object of the invention is the provision of a brake of the "servo" type, wherein the servo or self-energized portion of the brake has a braking surface composed mainly of one material, as one that increases its coefficient of friction when wet, and the other portion of the brake has a braking surface composed mainly of a different material, as one that decreases its coefficient of friction when wet.

A further object is generally to improve the construction and operation of brakes.

Fig. 1 is a sectional elevation of a brake embodying the present invention, taken along line 1—1 of Fig. 2.

Fig. 2 is a section along line 2—2 of Fig. 1.

Figs. 3 and 4 are sectional details taken respectively along lines 3—3 and 4—4 of Fig. 1.

Fig. 5 is a view similar to Fig. 1 but illustrating a modified form of brake embodying the invention.

The brake illustrated in Figs. 1 and 2 is of the three-shoe, internal expanding servo, or self-energizing type, well known in the art, and including the oppositely-extended rigid shoes 10 and 12 pivoted at 14 and 16 respectively to arms 18 of a fixed bracket 20. A rotatable brake drum 22 encloses and is adapted to be engaged by said shoes. A third rigid or servo shoe 24 is pivoted at 26 to the free end of the shoe 10 and has its free end 28 confronting the free end 30 of the shoe 12. Suitable operating mechanism, here shown as a rotatable cam 32 is located between said confronting ends and is adapted to spread them apart and into frictional engagement with the brake drum. Due to the frictional engagement between the drum and the servo shoe, and the rotation of the drum, said servo shoe is caused to press the shoe 10 forcibly against the brake drum with an effect that is materially greater than that due solely to the action of the cam 32. The servo action thus multiplies the braking effort supplied by the cam. This action is well known and need not be further explained.

A spring 34 is extended between the free ends of the brake shoes 12 and 24 to hold them yieldingly out of engagement with the brake drum when the cam is in normal or unoperated position. A second spring 36 is connected with the brake shoe 10 for the same purpose.

The brake shoe 12 has a brake lining 38 of suitable material. The brake shoe 10 has a suitable brake lining 40 which, say, is so characterized that it has its coefficient of friction, and braking effort, decreased when wet. So far as is known, all of the commonly used linings, as linings composed largely of asbestos fibres, and leather, are so characterized. In accordance with this invention, the servo shoe 24 has a brake lining, or surface, 42 which is characterized by having its coefficient of friction increased when wet. A metal lining or surface is so characterized. With this arrangement when the brake is wet, the frictional effort of the shoe 10 is decreased and the shoe 24 is increased, whereby one tends to compensate for the other. By reason of the servo action, and its multiplying effect, a braking surface for the servo shoe can be used which has a relatively small increase in frictional effect when wet and will compensate for a relatively great decrease in frictional effect of the shoe 10 when wet, thus to maintain the total braking effect practically unchanged. For the same reason the braking area of the servo shoe can be less than that of the shoe 10. The braking surface of the two shoes, their areas, and characteristics are so chosen that the combined braking effect is practically the same, when the brake is dry or wet, or when subject to other diverse conditions.

In the modification illustrated in Fig. 5 the servo or self-energized brake is of the type having a flexible band 44 which is located within the brake drum 46 and has a fixed end 48 and a free end 50. The brake band is adapted to be forced or wrapped into frictional engagement with the drum by the drag of the rotating drum on it. In accordance with this invention the band 44 is provided with two dissimilar brake surfaces or linings 52 and 54 which have the characteristics of the linings 40 and 42 as above set forth and which functions in the same manner.

In either case it is not important which of the braking surfaces is the one that has its coefficient of friction, or braking effort, increased when wet as the action is the same for, if the surface 40, or 52, increases its frictional effort when wet, the reduced effect of the surfaces 42, or 54, is to decrease the pressure thereon and to keep the braking effect practically constant.

I claim:

1. A brake having the combination of a rotary member, a brake member engageable therewith the frictional effect of which is different when the brake member is wet and dry, and operating mechanism for said brake member including means operated by said rotary member to apply on said brake member an actuating pressure which compensates for variation in the frictional character of said brake member under diverse conditions of wetness to such extent that the braking effect is practically the same whether the brake is wet or dry.

2. A brake having the combination of a rotary member, a brake member engageable therewith subject to a variable braking effect under diverse degrees of wetness, and means tending to compensate for said variable braking effect, including means to multiply the compensating effect of said first means to such extent that the braking effect is practically the same whether the brake is wet or dry.

3. A brake having the combination of a rotary member, a brake member engageable therewith subject to a variable braking effect under different degrees of wetness, means acted on by said rotary member adapted automatically to compensate for said variable braking effect and having means to multiply the compensating effect of said first means to such an extent that the braking effect of said brake member and said first means is the same when the brake is wet or dry.

4. A brake having the combination of a movable member, two brake members for retarding the movement of said movable member, and means for increasing the retarding effect of one brake member upon decrease of retarding effect of the other brake member to such extent when they are both subject to wetness that their combined effect remains the same whether they are wet or dry.

5. A brake having the combination of a movable member, two brake members for retarding the movement of said movable member, and means which vary the retarding effect of said brake members oppositely to such extent when the brake is subject to wetness that their combined effect is the same whether wet or dry.

6. A brake having the combination of a brake drum, two brake members acting thereon which have oppositely varying braking effects on said drum when subjected conjointly to wetness and means to enhance the variable braking effect of one member on said drum through said other member to such extent that the combined action of the brake members is the same whether they are wet or dry.

7. A brake having the combination of a brake drum, two brake members acting thereon which have oppositely varying braking effects on said drum when subjected conjointly to wetness that their combined effect is practically the same whether wet or dry, and means whereby one of said brake members urges the other brake member against said drum by the rotation of said drum.

8. A brake having the combination of a brake drum, two brake members bearing internally on said drum, and means connecting said members whereby the drag of the drum on one member forces the other member against the drum, said brake members having means which provides oppositely varying braking effects to such extent when subjected conjointly to wetness that their combined effect is practically the same whether wet or dry.

9. A brake having the combination of a brake drum, a brake member acting thereon, and a servo brake member acting on said drum and also on the aforesaid brake member, said brake members having oppositely varying frictional engagement with said drum to such extent when subjected conjointly to wetness that their combined effect is practically the same whether wet or dry.

10. A brake having the combination of a brake drum, a pivoted brake shoe acting on said drum, and a second shoe acting on said drum and also on said pivoted shoe in a direction to force it against said drum, said shoes having frictional engagement with said drum which vary oppositely when subjected conjointly to different conditions of wetness that their combined effect is practically the same whether the shoes are wet or dry.

11. A brake having the combination of a brake drum, a pivoted brake shoe acting on said drum, and a second shoe acting on said drum and also on said pivoted shoe in a direction to force it against said drum, said shoes having frictional engagement with said drum which vary oppositely when they are wet and in such relative degree that the action of said shoes on said drum is practically constant regardless of whether the shoes are wet or dry.

12. A brake having the combination of a brake drum, a pivoted brake shoe acting on said drum, and a servo shoe acting on said pivoted shoe and on said drum, said pivoted shoe having a frictional engagement with said drum which varies with diverse operating conditions of wetness, and said servo shoe having a frictional engagement with said brake drum and an action on said pivoted shoe which varies in an opposite manner to that of said pivoted shoe and to a degree to maintain the braking effect of both shoes practically constant whether the brake is wet or dry.

13. A brake having the combination of a drum, a brake shoe therefor, and a servo shoe having an actuating connection with the brake shoe, said brake and servo shoes having friction face-materials characterized by one having decreased and the other increased frictional effect when wet and present in such proportions and reacting one with the other through said actuating connection to such extent that the combined frictional effect of the shoes on the drum is practically the same whether the shoes are wet or dry.

14. A brake having the combination of a drum, a brake shoe having a lining which engages said drum and is characterized by having a reduced frictional effect when wet, a servo shoe having an actuating connection with said brake shoe and a lining which engages said drum and is characterized by having an increased frictional effect when wet, said two linings being present in such proportions and said actuating connection being such that the combined frictional effect of the two shoes on the drum is the same whether the linings are wet or dry.

In testimony whereof, I have signed my name to this specification.

TALMA T. GREENWOOD.